(12) United States Patent
Drossos

(10) Patent No.: US 6,896,626 B2
(45) Date of Patent: May 24, 2005

(54) LEGAL-FOR-PLAY LONG AND BELLY LENGTH PUTTER SHAFT FITMENT SYSTEM

(76) Inventor: William Drossos, 1206 Duncan Avenue, Penticton (CA), V1Y 7W6

( * ) Notice: Subject to any disclaimer, the term of this patent is extended or adjusted under 35 U.S.C. 154(b) by 61 days.

(21) Appl. No.: 10/629,750

(22) Filed: Jul. 30, 2003

(65) Prior Publication Data

US 2004/0023728 A1 Feb. 5, 2004

Related U.S. Application Data

(63) Continuation-in-part of application No. 10/196,140, filed on Jul. 17, 2002, now abandoned.

(51) Int. Cl.[7] ............................................. A63B 53/00
(52) U.S. Cl. ...................................... 473/294; 473/296
(58) Field of Search ................................. 473/305, 312, 473/239, 288, 296, 315, 298–299, 306–307, 294; 403/305, 356, 361, 370, 374.4, 383

(56) References Cited

U.S. PATENT DOCUMENTS

| | | |
|---|---|---|
| 3,848,737 A | 11/1974 | Kenon |
| 4,340,227 A | 7/1982 | Dopkowski |
| 4,664,382 A | 5/1987 | Palmer et al. |
| 4,852,782 A | 8/1989 | Wu et al. |
| 4,895,368 A | 1/1990 | Geiger |
| 5,588,921 A | 12/1996 | Parsick |
| 6,039,659 A | 3/2000 | Hamm |
| 6,213,890 B1 | 4/2001 | Prince |
| 6,547,673 B2 | 4/2003 | Roark |

*Primary Examiner*—Stephen Blau
(74) *Attorney, Agent, or Firm*—Antony C. Edwards

(57) ABSTRACT

A long and belly length putter fitment system includes a lower shaft section, an upper shaft section, and a coupler to join the upper and lower sections to form one singular putter. The upper and lower sections are selected from a selection having various lengths. Upper sections, each of differing length, may be combined in various combinations with lower sections, each of different overall length and/or lower section grip height, according to a fitment table. All upper shaft sections are compatible with all lower shaft sections through the use of the shaft coupler. Lower shaft sections can utilize shafts of various specifications with any number of putterhead styles or models affixed to the distal end of the lower shaft section.

20 Claims, 10 Drawing Sheets

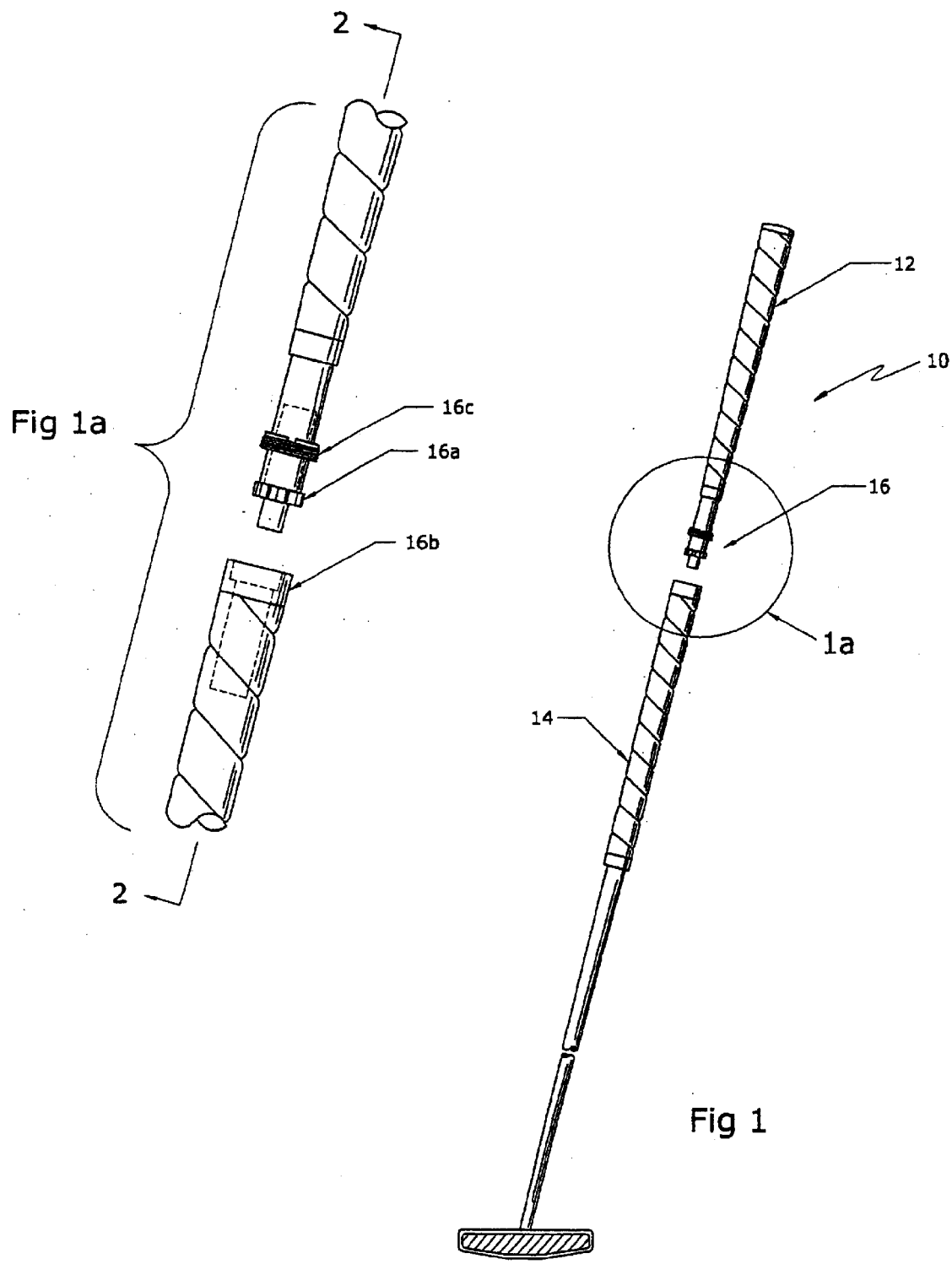

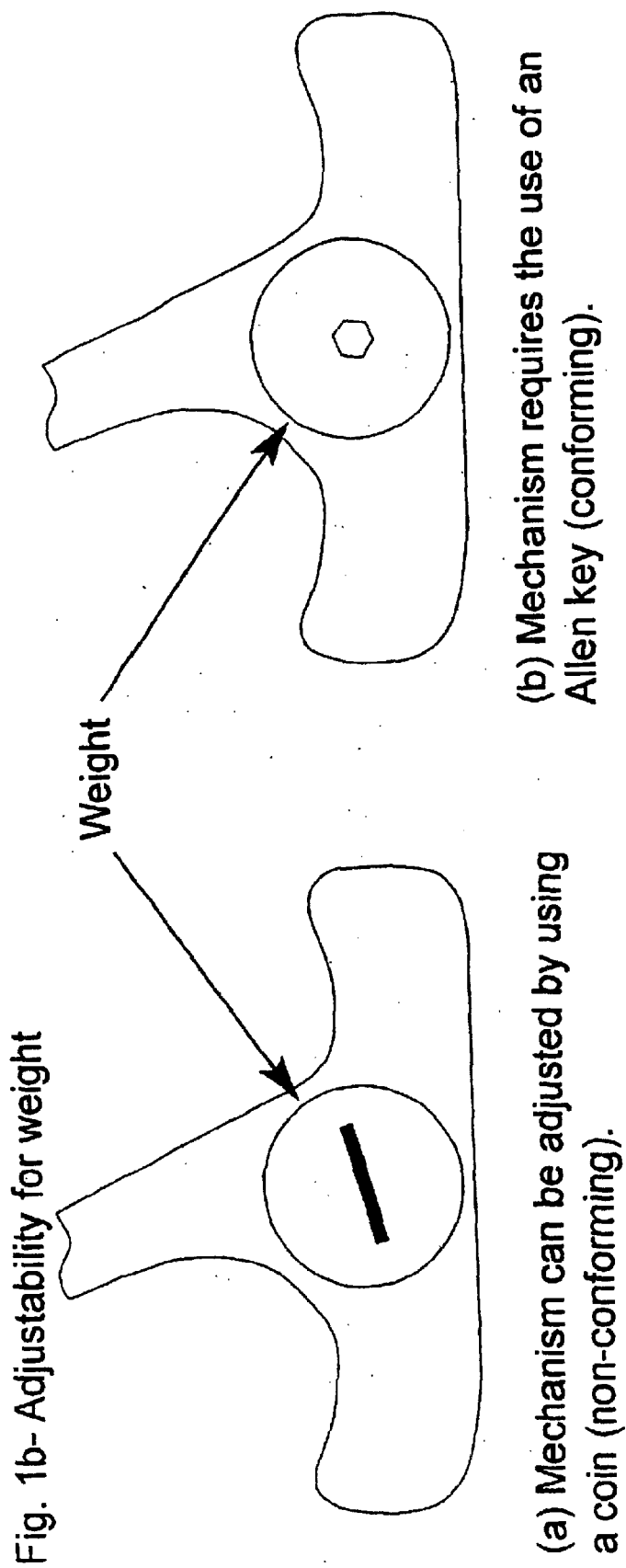
Fig. 1b - Adjustability for weight
(a) Mechanism can be adjusted by using a coin (non-conforming).
(b) Mechanism requires the use of an Allen key (conforming).
PRIOR ART

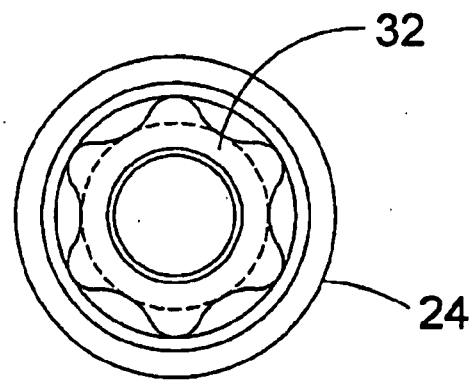
Fig 5a
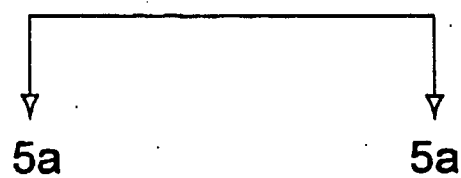
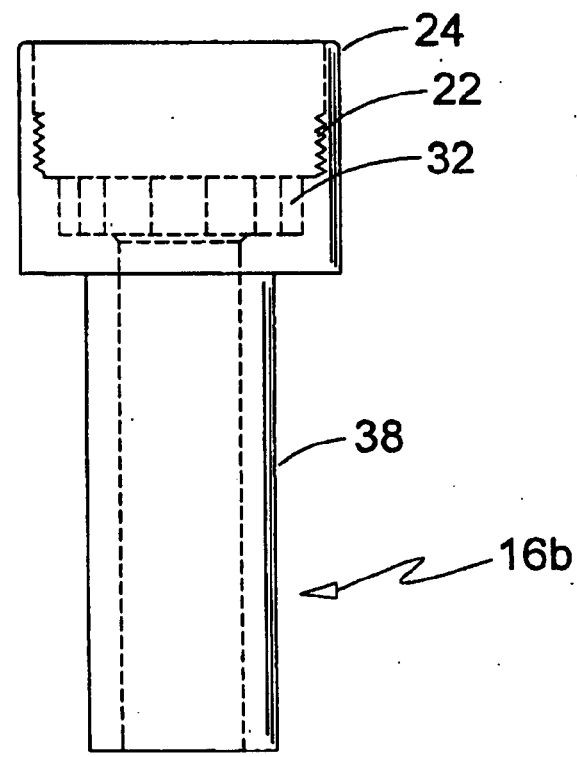
Fig. 5

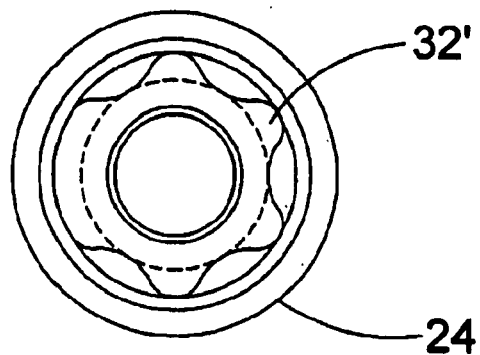
Fig 7a
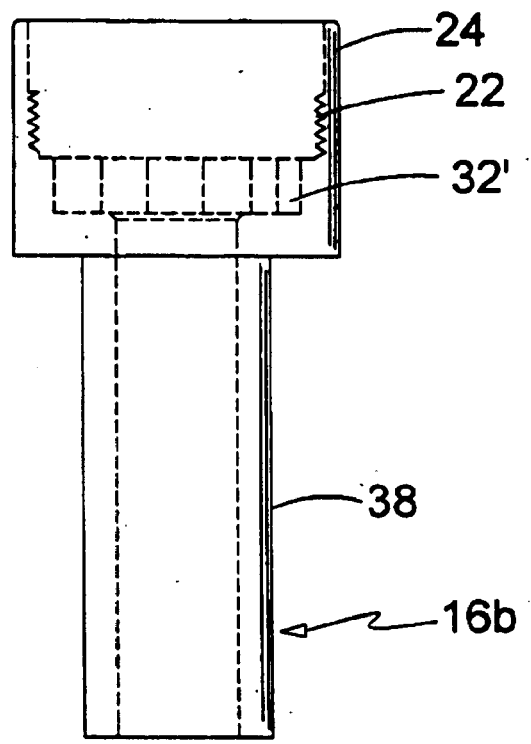
Fig 7b

FIGURE 8
UPPER SHAFT LENGTH GUIDE

| LOWER SECTION | A5" | B6" | C7" | D8" | E9" | F10" | G11" | H12" | I13" | J14" | K15" | L16" | M17" | N18" | O19" | P20" |
|---|---|---|---|---|---|---|---|---|---|---|---|---|---|---|---|---|
| Belly #1 28" | B1A 33" | B1B 34" | B1C 35" | B1D 36" | B1E 37" | B1F 38" | B1G 39" | B1H 40" | B1I 41" | B1J 42" | B1K 43" | B1L 44" | B1M 45" | B1N 46" | B1O 47" | B1P 48" |
| Belly #2 29" | B2A 34" | B2B 35" | B2C 36" | B2D 37" | B2E 38" | B2F 39" | B2G 40" | B2H 41" | B2I 42" | B2J 43" | B2K 44" | B2L 45" | B2M 46" | B2N 47" | B2O 48" | B2P 49" |
| Belly #3 30" | B3A 35" | B3B 36" | B3C 37" | B3D 38" | B3E 39" | B3F 40" | B3G 41" | B3H 42" | B3I 43" | B3J 44" | B3K 45" | B3L 46" | B3M 47" | B3N 48" | B3O 49" | B3P 50" |
| Belly #4 31" | B4A 36" | B4B 37" | B4C 38" | B4D 39" | B4E 40" | B4F 41" | B4G 42" | B4H 43" | B4I 44" | B4J 45" | B4K 46" | B4L 47" | B4M 48" | B4N 49" | B4O 50" | B4P 51" |
| Belly #5 32" | B5A 37" | B5B 38" | B5C 39" | B5D 40" | B5E 41" | B5F 42" | B5G 43" | B5H 44" | B5I 45" | B5J 46" | B5K 47" | B5L 48" | B5M 49" | B5N 50" | B5O 51" | B5P 52" |
| Belly #6 33" | B6A 38" | B6B 39" | B6C 40" | B6D 41" | B6E 42" | B6F 43" | B6G 44" | B6H 45" | B6I 46" | B6J 47" | B6K 48" | B6L 49" | B6M 50" | B6N 51" | B6O 52" | B6P 53" |
| Belly #7 34" | B7A 39" | B7B 40" | B7C 41" | B7D 42" | B7E 43" | B7F 44" | B7G 45" | B7H 46" | B7I 47" | B7J 48" | B7K 49" | B7L 50" | B7M 51" | B7N 52" | B7O 53" | B7P 54" |
| Belly #8 35" | B8A 40" | B8B 41" | B8C 42" | B8D 43" | B8E 44" | B8F 45" | B8G 46" | B8H 47" | B8I 48" | B8J 49" | B8K 50" | B8L 51" | B8M 52" | B8N 53" | B8O 54" | B8P 55" |
| Belly #9 36" | B9A 41" | B9B 42" | B9C 43" | B9D 44" | B9E 45" | B9F 46" | B9G 47" | B9H 48" | B9I 49" | B9J 50" | B9K 51" | B9L 52" | B9M 53" | B9N 54" | B9O 55" | B9P 56" |
| Long #1 34" | L1A 39" | L1B 40" | L1C 41" | L1D 42" | L1E 43" | L1F 44" | L1G 45" | L1H 46" | L1I 47" | L1J 48" | L1K 49" | L1L 50" | L1M 51" | L1N 52" | L1O 53" | L1P 54" |
| Long #2 36" | L2A 41" | L2B 42" | L2C 43" | L2D 44" | L2E 45" | L2F 46" | L2G 47" | L2H 48" | L2I 49" | L2J 50" | L2K 51" | L2L 52" | L2M 53" | L2N 54" | L2O 55" | L2P 56" |
| Long #3 38" | L3A 43" | L3B 44" | L3C 45" | L3D 46" | L3E 47" | L3F 48" | L3G 49" | L3H 50" | L3I 51" | L3J 52" | L3K 53" | L3L 54" | L3M 55" | L3N 56" | L3O 57" | L3P 58" |
| Long #4 40" | L4A 45" | L4B 46" | L4C 47" | L4D 48" | L4E 49" | L4F 50" | L4G 51" | L4H 52" | L4I 53" | L4J 54" | L4K 55" | L4L 56" | L4M 57" | L4N 58" | L4O 59" | L4P 60" |
| Long #5 42" | L5A 47" | L5B 48" | L5C 49" | L5D 50" | L5E 51" | L5F 52" | L5G 53" | L5H 54" | L5I 55" | L5J 56" | L5K 57" | L5L 58" | L5M 59" | L5N 60" | L5O 61" | L5P 62" |

LEGAL-FOR-PLAY LONG AND BELLY LENGTH PUTTER SHAFT FITMENT SYSTEM

CROSS REFERENCE TO RELATED APPLICATION

This application is a continuation-in-part of U.S. patent application Ser. No. 10/196,140 filed Jul. 17, 2002 now abandoned entitled Long and Belly Putter Shaft Fitment System.

FIELD OF THE INVENTION

The invention relates to a method and apparatus for fitment of elongated putters for play in accordance with the rules of golf.

BACKGROUND OF THE INVENTION

So called long and belly length putters offer many golfers the potential to achieve a smoother more pendulum like putting stroke advantageously improving the golfers likelihood of making a putt. The primary disadvantage of a long and/or belly length putter is that a golfer must be properly fitted to be comfortable when using the putter in order to achieve a beneficial result. Further, some long putters may be too long to facilitate ease of storage and/or storage for the purpose of transportation. The present invention is an improvement over the prior art wherein threaded shafts, jam nuts, detent pins, tapered shanks, collapsible shafts, lock nuts, threaded pins, removable grips, compression rings, conical bushings, locking pins, and set screws or combinations thereof are used as the primary means of adjustment for fitting or connection of the upper and lower shaft segments of a long or belly length putter. These mechanisms are of unnecessarily complicated design, and in some cases lacking user friendliness and may be illegal for play in accordance with the United States Golf Association and or the Royal and Ancient Rules of Golf of Saint Andrews, Scotland or the Royal Canadian Golf Association.

Applicant is aware of numerous attempts in the prior art to improve the field of golf clubs, putters, and particularly long and belly length putters. As an example the following United States patents deal with the connection, adjustability, and fitment of long and belly length putters: U.S. Pat. No. 6,283,874 which issued to Studebaker on Sep. 4, 2001, for a Golf Putter; U.S. Pat. No. 6,213,890 which issued to Prince on Apr. 10, 2001 for a Golf Putter; U.S. Pat. No. 5,997,412 which issued to Benson on Dec. 7, 1999 for an Extensible Golf Club; U.S. Pat. No. 5,976,030 which issued to Hsieh on Nov. 2, 1999 for an Adjustable Golf Club Handle Mounting Arrangement; U.S. Pat. No. 5,649,870 which issued to Harrison on Jul. 22, 1997 for an Elongated Golf Club Putter; U.S. Pat. No. 5,496,029 which issued to Heath et al. on Mar. 5, 1996 for an Adjustable Golf Shaft; U.S. Pat. No. 5,452,891 which issued to Thomas on Sep. 26, 1995 for a Golf Putter Improvements and Converter Methods; U.S. Pat. No. 4,104,802 which issued to Johnston on Aug. 8, 1978 for an Apparatus for Use In Manufacturing And Selecting Golf Clubs; U.S. Pat. No. 3,679,207 which issued to Florian on Jul. 25, 1972 for a Golf Putter Construction; U.S. Pat. No. 3,663,019 which issued to Palotsee on May 16, 1972 for an Adjustable Golf Putter; and applicant is further aware of the International Patent Application, No. PCT/NZ98/00056, for the Golf Club of Moore.

What follows is an excerpt from a publication of the United States Golf Association entitled A Guide to the Rules on Clubs and Balls, and in particular an excerpt regarding the rules for the adjustability of clubs:

"Adjustability

Appendix II, 1b states that:

Woods and irons shall not be designed to be adjustable except for weight. Putters may be designed to be adjustable for weight and some other forms of adjustability are also permitted. All methods of adjustment permitted by the Rules require that:
 (i) the adjustment cannot be readily made;
 (ii) all adjustable parts are firmly fixed and there is no reasonable likelihood of them working loose during a round; and
 (iii) all configurations of adjustment conform with the Rules.

The disqualification penalty for purposely changing the playing characteristics of a club during a stipulated round (Rule 4-2a) applies to all clubs including a putter.

(i) General

In order to preserve the integrity of Rule 4-2 (Playing Characteristics Changed), this rule clearly states that it must not be too easy for a player to make adjustments during the course of a stipulated round. This is interpreted to mean that adjustments must require the use of a special tool, such as an Allen key or a Phillips screwdriver. It must not be possible to make the adjustments during a round.

(ii) Adjustability for Weight

All clubs may be designed to be adjustable for weight, provided the adjustment mechanism conforms to the conditions described previously and in Appendix II,1b of the Rules. Examples of what would and would not be permitted are illustrated below. [see FIG. 1b]

As already noted in Design of Clubs, Section 1a, with respect to adjustments for weight, the only exception to the conditions described in (i) above is the addition or removal of lead tape. This is a practice which pre-dates the introduction of the adjustability rules and is permitted on 'traditional' grounds. Of course, the addition or removal of lead tape during a round is not permitted (see Rule 4-2a and Decision 4-2/0.5 in "Decisions on the Rules of Golf").

(iii) Other Kinds of Adjustability

Only putters may be designed to be adjustable in ways other than weight. For example, a putter may be designed to be adjustable for lie and length. Again, these adjustments must require the use of a special tool, not just the fingers or a coin, etc. If, as is often the case, a screw is used to fix the mechanism, the putter must, for all practicable purposes, be unusable without the screw being in place and tightly fixed.

When assessing the conformity of an adjustable putter, it is important to remember the third condition listed in Appendix II, 1b, and to ensure that the putter cannot be adjusted into a position which does not conform to the Rules. For example, a putter which is adjustable for lie must not be adjustable into a position where the shaft diverges from the vertical by less than ten degrees (see Appendix II, 1d and Design of Clubs, Section 1d), or any other position which would render the club non-conforming."

It has been the applicant's observation that so called belly putters and so called long putters require a trial and error fitment process of the end user in order for the end user to arrive at a satisfactory combination of grip positioning and overall length so as to thereby be able to comfortably use long and belly length putters. Because golfers come in various shapes and sizes, and golfers use putters differently, trial and error fitment is advantageous when long and belly length putters are being considered for purchase.

Although popular on various golf professional tours, with professionals of all ages, long and belly length putters have not made significant inroads with the golfing public. Retailers are reluctant to inventory items that may only fit or work for very few individuals.

It has been the applicant's observation that a legal-for-play, user friendly fitment system could satisfy both golfers' demands and retailers' reservations thereby bringing long and belly length putters to mainstream golfing. Additionally, a belly length putter fitment system could be used to arrive at an overall length measurement for a single long grip belly length putter.

SUMMARY OF THE INVENTION

The long and belly length putter fitment system of the present invention includes a lower shaft section complete with putter head, an upper shaft section, and a coupler to join the upper and lower sections to form one singular putter. The upper and lower sections are selected from a selection having various lengths. For example, upper sections, each of differing length, may be combined in various combinations with putter lower sections, each of different overall length and/or lower section grip height. All upper shaft sections are compatible with all lower shaft sections through the use of the shaft coupler. Lower shaft sections can utilize shafts of various specifications with any number of putterhead styles or models affixed to the distal end of the lower shaft section.

Thus in summary, the long and belly length putter shaft fitment system of the present invention may be characterized as including:

(a) an upper shaft selected from a group of upper shafts,
(b) a lower shaft selected from a group of lower shafts, including putter head
(c) a universal coupler for fitting each of the upper shafts from the group of upper shafts onto each of the lower shafts from the group of lower shafts.

The coupler provides for interchangeable releasable mating engagement of upper and lower shafts, the former onto the latter. Thereby, any one upper shaft may be mated onto any one lower shaft. Within the groups of upper and lower shafts are upper and lower shafts of different lengths.

To satisfy the rules of golf the following minimum dimensions apply.

The group of upper shafts may include upper shafts having lengths ranging from 6.5 inches and longer. The group of lower shafts may include belly length putters having lengths ranging from eighteen inches and longer, and long length putters having lengths ranging from eighteen inches and longer.

The coupler may include first and second sections, where the first sections are mounted to upper shafts, and the second sections are mounted to lower shafts. The first and second sections are non-rotatably mountable to each other, that is, they cannot be rotated relative to each other once mounted to each other. A male non circular annular flange on one of the sections slidably mates along a longitudinal axis of the upper and lower shafts into a female non circular relief in the other of the sections. Locking means are provided for releasably locking the non circular annular flange into the non circular flange relief.

The first section of the coupler may be a cylindrical body mountable at a first end thereof to a lower end of the upper shaft and having at an opposite second end the non circular annular flange extending therefrom. The second section of the coupler may be a cylindrical body mountable at a first end thereof to an upper end of the lower shaft and having, at an opposite second end, the non circular flange relief formed therein.

The non circular annular flange may be a rigid member having a non-round cross-section in a plane orthogonal to the longitudinal axis. The flange relief may be a correspondingly shaped cavity for snug sliding fitment of the non circular annular flange into the flange relief so as to prevent rotation of the non circular annular flange about the longitudinal axis relative to the flange relief.

The locking means may be a threaded collar slidably and rotatably mounted on the cylindrical body of the upper shaft section. The second end of the second section of the coupler may have internal threads formed thereon for threaded mating with the threads on the collar. The first section of the coupler may have a non circular annular flange on the second end. The collar clamps the flange against the second end of the second section of the coupler when threaded onto the threads on the second end of the second section of the coupler.

The annular flange may be of non round cross section mating with a corresponding non round relief in the receiver section. The non round annular flange may be asymmetric and the female flange relief may have a corresponding asymmetry. For example, the annular flange may include a singular axis asymmetrical non round cross section in which case the female flange relief has a corresponding singular axis asymmetrical non round relief. The annular flange may also include a bi axis asymmetrical non round cross section in which case the female flange relief has a corresponding bi axis asymmetrical relief.

The long and belly length putter shaft fitment method using the above device according to the present invention the steps of:

(a) selecting an upper shaft from the group of upper shafts,
(b) selecting a lower shaft from the group of lower shafts,
(c) using the universal coupler, fitting one of the upper shafts of the group of upper shafts onto one of the lower shafts of the group of lower shafts and interchanging different sized or lengths of the shafts until a correct fit is achieved and then recording or making note of the correct lengths to achieve the fit.

BRIEF DESCRIPTION OF THE DRAWINGS

FIG. 1 is, in side elevation partially cut away view, a long or belly length putter shaft of the long and belly length putter shaft fitment system of the present invention.

FIG. 1a is an enlarged partially cut away view taken from FIG. 1.

FIG. 1b is an illustration from the prior art publication entitled "A Guide to the Rules on Clubs and Balls".

FIG. 2 is a cross sectional view along line 2—2 in FIG. 1a.

FIG. 5 is, in side elevation view, a second or lower section of the shaft coupler according to one aspect of the present invention.

FIG. 5a is a top view along line 5a—5a in FIG. 5.

FIG. 7 is, in side elevation view, the lower section of the shaft coupler according to a further embodiment of the present invention.

FIG. 7a is a view along line 7a—7a in FIG. 7.

FIG. 8 is a fitment table according to an aspect of the long and belly length putter fitment system of the present invention.

DETAILED DESCRIPTION OF EMBODIMENTS OF THE INVENTION

Figure 2:
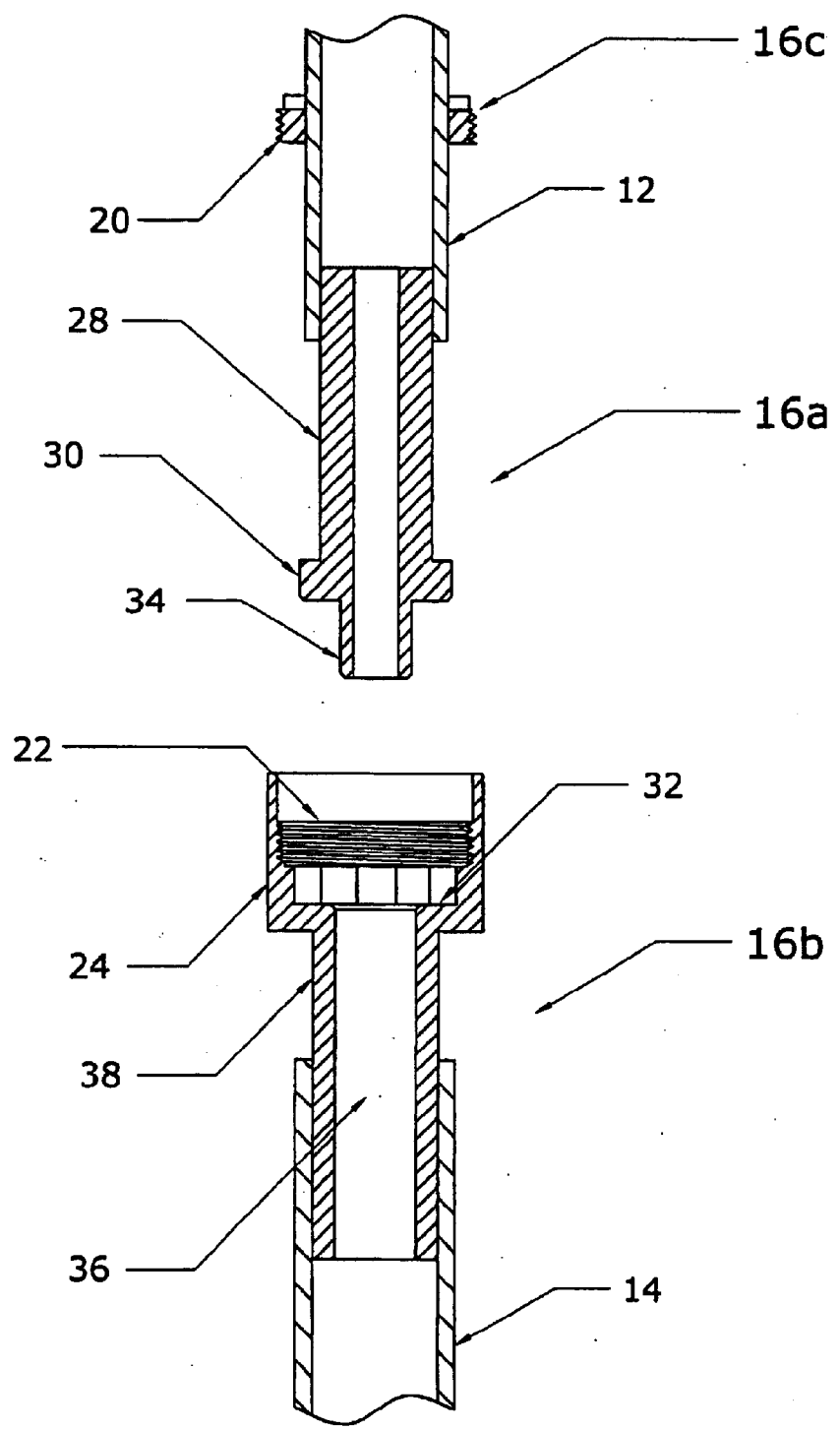

As seen in FIG. 1, putter 10 includes upper shaft component 12 mounted interchangeably to lower shaft component 14 by means of a coupler 16. Shaft components 12 and 14 may be of various lengths to allow proper fitment and use of putter 10 as a long putter or belly length putter. The ends of coupler 16 are sized to fit within the inner diameter of the hollow ends of shafts 12 and 14. The coupler includes an upper bolt section 16a, a lower receiver section 16b, and a threaded sliding collar 16c.

Figure 2A:
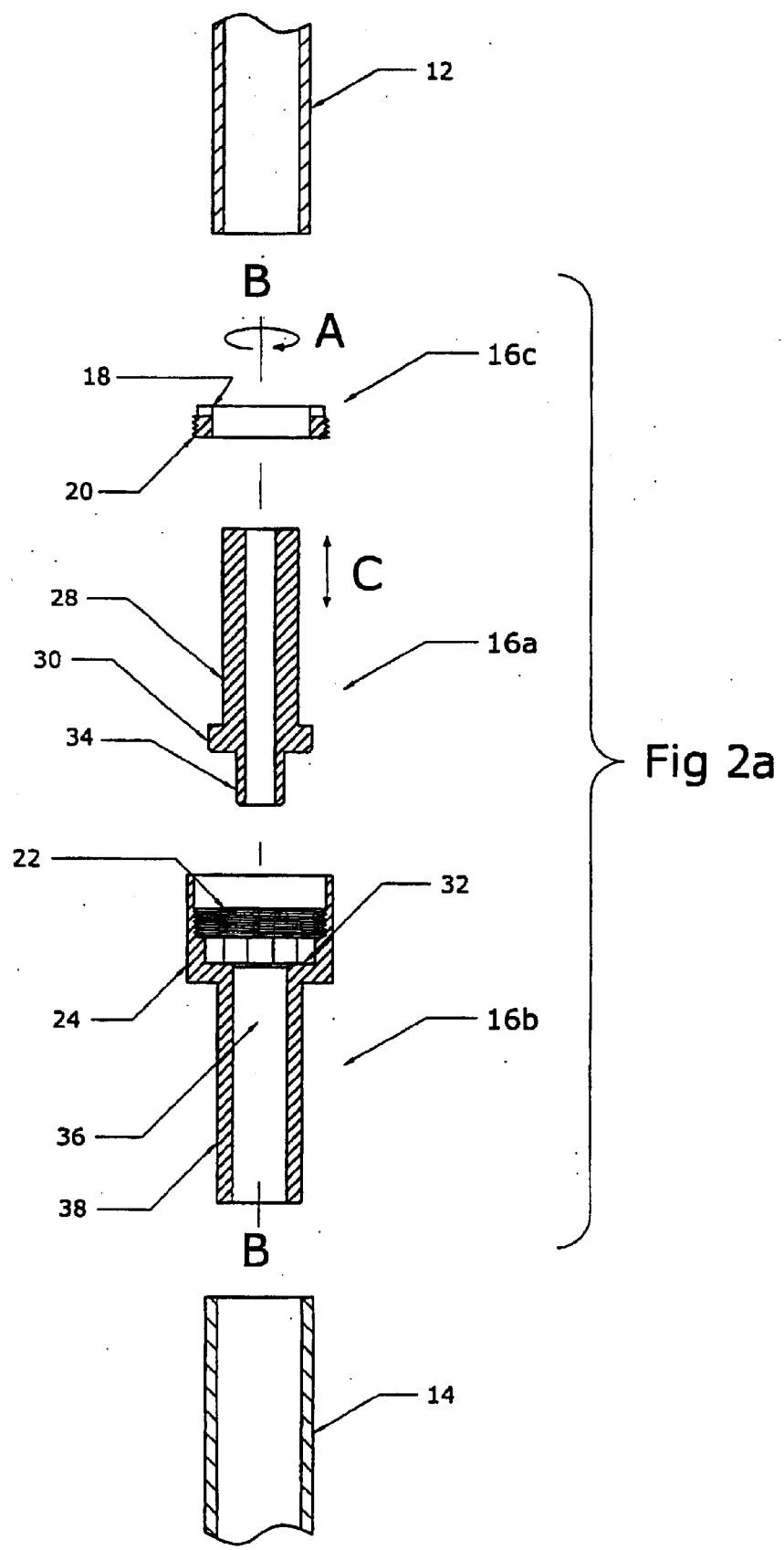
FIG. 2a is an exploded view of FIG. 2.
Figure 3:
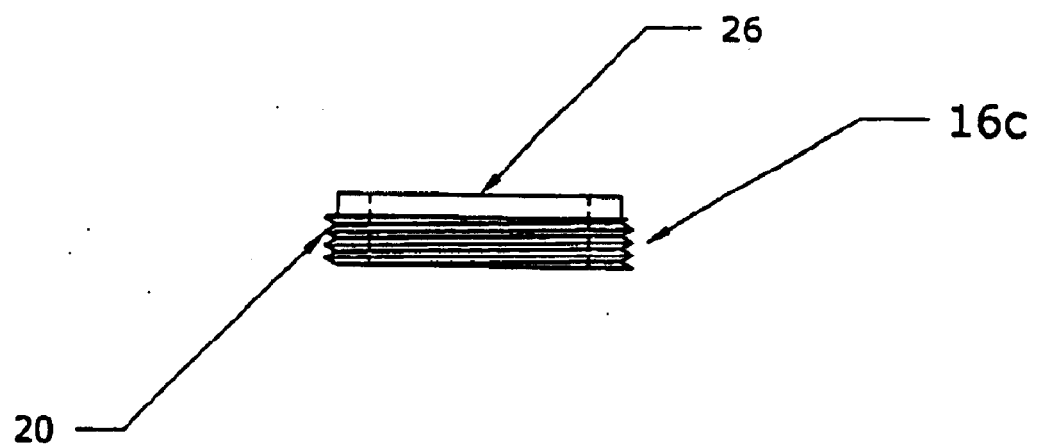
FIG. 3 is in side elevation view the locking collar of FIG. 1.
Figure 3A:
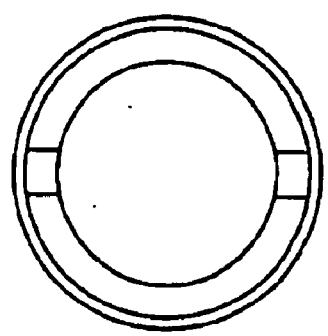
FIG. 3a is, in plan view, the locking collar of FIG. 3.

The smooth inner bore of threaded collar 16c, better seen in FIGS. 2 and 2a, is sized for a snug sliding fit over the outer diameter of upper shaft section to allow for smooth rotation of the collar in direction A about longitudinal axis B, and simultaneous longitudinal sliding in direction C. Collar 16c has an external helical thread 20 matched to the internal thread 22 in hub 24 lower receiver section 16b. Threaded collar 16c advantageously includes recessed surfaces as seen in FIG. 3 sized to mate with a face pin spanner type wrench to facilitate tightening and or loosening of the collar down onto the lower receiver section. Upper bolt section 16a may have a hollow shank section 28 sized to fit the inner diameter of a hollow upper shaft wherein the shank may be either adhesively bonded or pressed into place in the shaft.

Lower receiver section 16b has a hollow shank section 38 sized to fit the inner diameter of a hollow lower shaft 14. It too may be either adhesively bonded or pressed into place in the lower shaft.

Figure 4:
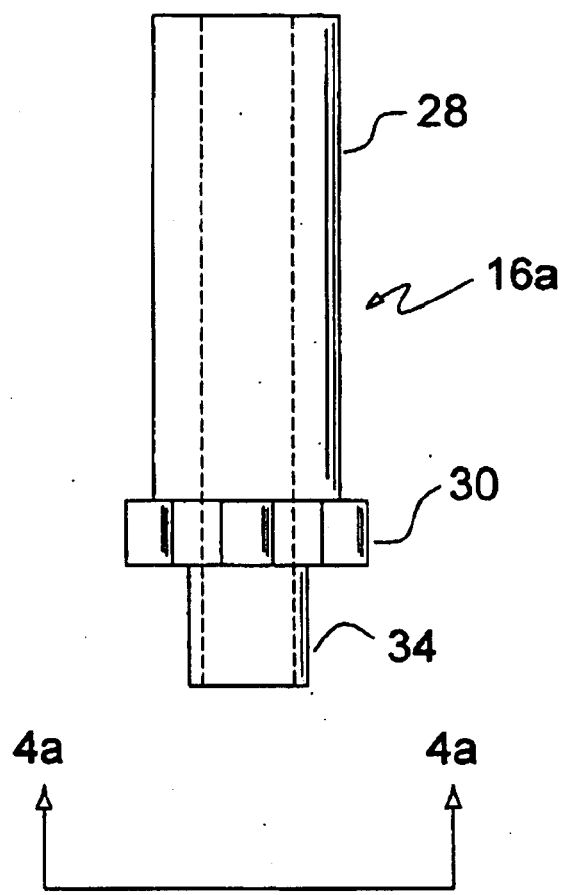
FIG. 4 is, in side elevation view, the first or upper section of the shaft coupler according to one aspect of the present invention.
Figure 4A:
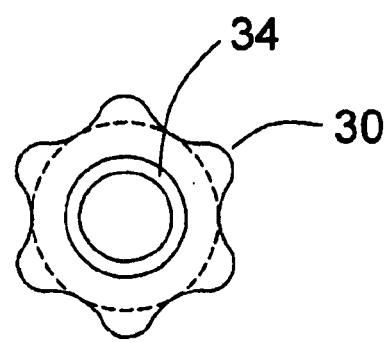
FIG. 4a is a bottom view along line 4a—4a in FIG. 4.

A non circular annular flange 30 on bolt section 16a such as seen in FIGS. 4 and 4a mates with a non circular flange relief 32 on receiver 16b such as seen in FIGS. 5 and 5a. Non circular annular flange 30 protrudes from bolt section 16a so as to snugly mate into a flange relief 32 in receiver section 16b. The flange and flange relief may be for example non round, such as scalloped as illustrated, in cross section so as to prevent relative rotational translation between bolt section 16a and receiver section 16b when the flange is mounted into the flange receiver, such as when an upper shaft is mated to a lower shaft according to the present invention.

Figure 6:
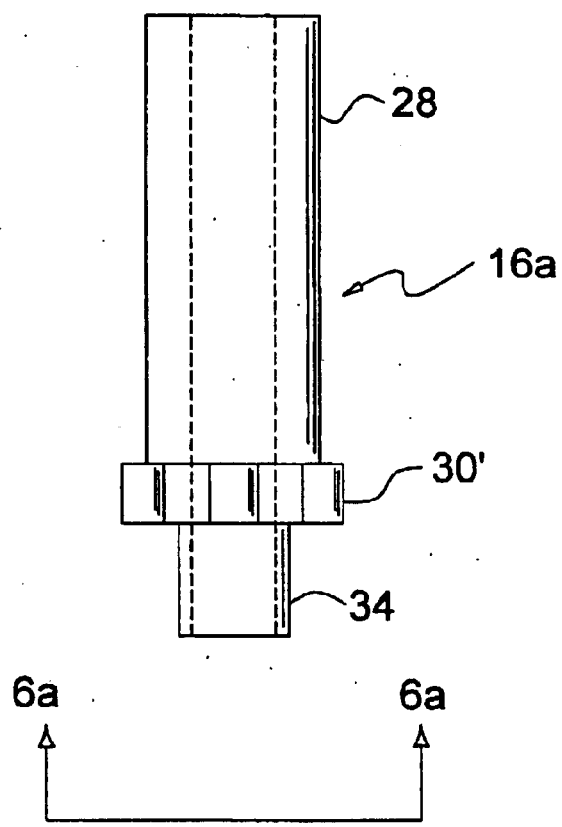
FIG. 6 is, in side elevation view, the upper section of the shaft coupler according to a further embodiment of the present invention.
Figure 6A:
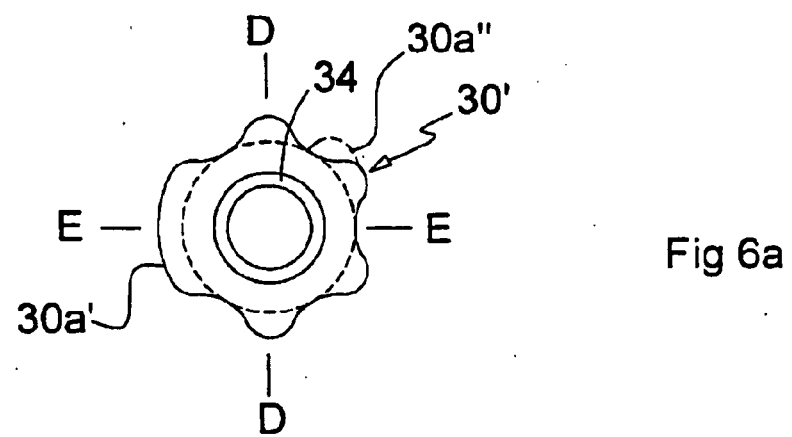
FIG. 6a is a view along line 6a—6a in FIG. 6.

The use of an asymmetrical non circular annular flange 30' having for example a singular axis asymmetric bulge 30a' asymmetrical about axis D such as seen in FIGS. 6 and 6a, allows for alignment of the grips on the upper and lower shafts where the use of logos or alignment marks along the grip is desired. The asymmetry of the flange may include more than single axis asymmetry. For example if bulge 30a" (shown in dotted outline) is added, then the flange, and corresponding receiver section, will have a bi axis asymmetry, that is, is asymmetrical about both orthogonal axes D and E.

The non circular annular flange 30 or 30' must be fully engaged into correspondingly shaped relief 32 or 32' in order for the seating surfaces to mate and to allow for engagement of the threads on the threaded collar with the threads on the receiver section. Additionally, the combination of the centering key, non circular annular flange, and threaded collar inner bore promotes correct engagement of the threads on the collar with the threads on the lower receiver section.

The rules of golf allow for the use of a two piece puttershaft providing that:

(i) The shaft is not adjustable during play in overall length and lie angle.

(ii) Modification (for example assembly and disassembly) requires the use of a special tool or tools.

(iii) The shaft remains straight from a distance of five inches above the sole of the putter.

(iv) If two grips are used both must be circular in cross section and at least 1.5 inches apart and neither grip can fit within the players palm under 5 inches or exceed one and three quarter inches in diameter.

(v) There is no reasonable likelihood of working loose during a round of golf.

The coupler 16 of the present invention satisfies the rules of golf for the following reasons:

(i) The mating of the bolt section onto the receiver section so as to mate seat 30 onto land 32 ensures that the entire shaft remains straight and set to a fixed length, (ii) The non circular annular flange 30 or 30' on the bolt section and flange relief 32 or 32' respectively on the receiver section prevents rotation of the upper shaft relative to the lower shaft thus preventing the golfer from disassembling the shaft by gripping and rotating the shaft sections counter to one another, and (iii) The threaded collar may only be properly tightened so as to rigidly mate the upper shaft onto the lower shaft and thus may only then be loosened with a tool such as a face pin spanner type wrench.

Without intending to be limiting, shaft coupler 16 may be made of aluminum, titanium, brass, steel, copper, or for example compositions such as metallic compositions, carbon composites, polycarbonates, and plastics including fibreglass reinforced plastics and the like. The shaft coupler may be manufactured by machining, forging, casting, moulding, or any combination thereof, for any of said couplers components. In one manufacturing method, shaft coupler 16 may be precision lathe turned from a high strength light alloy thus ensuring proper shaft alignment, solidity of feel and high strength without the weight penalty associated with heavier materials.

The table illustrated in FIG. 8 is an example of the variety of combinations of common putter sizes which may be accommodated according to the present invention. Thus in the illustrated example, not intended to be limiting, sixteen upper shaft lengths ranging from five to twenty inches, way be interchangeably combined with fourteen lower shaft lengths and styles (twenty-eight to thirty-six inch belly length and thirty-four to forty-two inch long length) for a tabulated total of two hundred twenty-four combinations afforded a retailer or pro-shop by the retention of a stock of merely 30 pieces. Thus a retailer merely has to use a fitment table such as illustrated in FIG. 8 to allow the fitment of appropriate upper and lower sections for a particular user, each such combination having its own unique fitment code. The fitment code for a particular user might for example be retained in a data base for later use in fitting new putters to the particular user.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A legal-for-play long and belly length putter shaft fitment system comprising:
   (a) an upper shaft selected from a group of upper shafts,
   (b) a lower shall selected from a group of lower shafts,
   (c) a universal coupler for fitting each said upper shaft of said group of upper shafts onto each said lower shaft of said group of lower shafts into interchangeable releasable mating engagement thereon wherein any one said upper shaft of said group of upper shafts is mated onto any one said lower shaft of said group of lower shafts,
   said coupler comprising first and second sections, said first sections mounted to said group of upper shafts, said second sections mounted to said group of lower shafts,
   said first and second sections non-rotatably mountable to each other by a male correspondingly shaped non-circular annular flange on one of said sections slidably mating along a longitudinal axis of said upper and lower shafts into a female non-circular flange relief in the other of said sections wherein entire said annular flange is received in said relief, locking means for releasably locking said flange into said flange relief,
   wherein said groups of upper and lower shafts include respectively upper and lower shafts of different lengths.

2. The system of claim 1 wherein said group of upper shafts includes upper shafts having lengths ranging from 6.5 inches and longer.

3. The system of claim 2 wherein said group of lower shafts includes at least belly length shafts having lengths ranging from eighteen inches and longer.

4. The system of claim 2 wherein said group of lower shafts includes at least long length shafts having lengths ranging from eighteen inches and longer.

5. The system of claim 1 wherein said first section is a cylindrical body mountable at a first end thereof to a lower end of said upper shaft and having at an opposite second end, said non-circular annular flange extending therefrom, and wherein said second section is a cylindrical body mountable at a first end thereof to an upper end of said lower shaft and having, at an opposite second end, said non-circular annular relief formed therein.

6. The system of claim 5 wherein said non-circular annular flange is a rigid member having a non-round cross-section in a plane orthogonal to said longitudinal axis, and wherein said flange relief is a correspondingly shaped cavity for snug sliding fitment of said non-circular annular flange into said flange relief so as to prevent rotation of said flange about said longitudinal axis relative to said flange relief.

7. The system of claim 6 wherein said looking means is a threaded collar slidably and rotatably mounted on said cylindrical body of said upper shaft section, and wherein said second end of said second section has threads formed thereon for threaded mating with said threads on said collar, said first section having a non-circular annular flange on said second end,
said collar for clamping said flange against said second end of said second section when threaded onto said threads on said second end of said second section.

8. The system of claim 7 wherein said annular flange includes a singular axis asymmetrical non-round cross section and said female flange relief has a corresponding singular axis asymmetrical non-round relief.

9. The system of claim 7 wherein said annular flange includes bi-axis asymmetrical non-round cross section and said female flange relief has a corresponding bi-axis asymmetrical relief.

10. The system of claim 7 wherein said annular flange is asymmetric and said female flange relief has a corresponding asymmetry.

11. A legal-for-play long and belly length putter shaft fitment method comprising the steps of:
    (a) selecting an upper shaft from a group of upper shafts,
    (b) selecting a lower shaft from a group of lower shafts,
    (c) providing a universal coupler and fitting one said upper shaft of said group of upper shafts onto one said lower shaft of said group of lower shafts into interchangeable releasable mating engagement thereon wherein any one said upper shaft of said group of upper shafts is mated onto any one said lower shaft of said group of lower shafts,
    wherein said coupler comprises first and second sections, said first sections mounted to said group of upper shafts, said second sections mounted to said group of lower shafts,
    said first and second sections non-rotatably mountable to each other by a non-circular annular flange on one of said sections slidably mating along a longitudinal axis of said upper and lower shafts into a female flange relief in the other of said sections wherein entire said annular flange is received in said relief, locking means for releasably locking said flange into said flange relief,
    wherein said groups of upper and lower shafts include respectively upper and lower shafts of different lengths.

12. The method of claim 11 wherein said step of selecting an upper shaft from said group of upper shafts includes selecting a length of shaft from upper shafts having lengths ranging from 6.5 inches and longer.

13. The method of claim 12 wherein said step of selecting a lower shaft from said group of lower shafts includes selecting belly length putter shafts from belly length putter shafts having lengths ranging from eighteen inches and longer.

14. The method of claim 12 wherein said step of selecting a lower shaft from said group of lower shafts includes selecting long length shafts from long length putter shafts having lengths ranging from eighteen inches and longer.

15. The method of claim 11 wherein said first section is a cylindrical body mountable at a first end thereof to a lower end of said upper shaft and having at an opposite second end, said non-circular annular flange extending therefrom,
    and wherein said second section is a cylindrical body mountable at a first end thereof to an upper end of said lower shaft and having, at an opposite second end, said flange relief formed therein,
    wherein said non-circular annular flange is a rigid member having a non-round cross-section in a plane orthogonal to said longitudinal axis, and wherein said flange relief is a correspondingly shaped cavity for snug sliding fitment of said non-circular annular flange into said flange relief so as to prevent rotation of said non-circular annular flange about said longitudinal axis relative to said flange relief,
    and wherein said step of fitting an upper shaft onto a lower shaft includes sliding said non-circular annular flange into said flange relief.

16. The method of claim 15 wherein said locking means is a threaded collar slidably and rotatably mounted on said cylindrical body of said upper shaft section, and wherein said second end of said second section has threads formed thereon for threaded mating with said threads on said collar, said first section having a non-circular annular flange on said second end, said collar for clamping said non-circular annular flange against said second end of said second section when threaded onto said threads on said second end of said second section, further comprising the steps of locking said first section onto said second section by threading and tightening said collar onto said second section.

17. The method of claim 16 wherein said annular flange is of non-round scalloped cross section mating with corresponding non-round scalloped relief in said receiver section.

18. The method of claim 16 wherein said annular flange includes a singular axis asymmetrical non-round cross section and said female flange relief has a corresponding singular axis asymmetrical non-round relief.

19. The method of claim 16 wherein said annular flange include bi-axis asymmetrical non-round cross section and said female flange relief has a corresponding bi-axis asymmetrical relief.

20. The method of claim 16 wherein said annular flange is asymmetric and said female flange relief has a corresponding asymmetry.

* * * * *